W. J. PHELPS.
CAN FILLING MACHINE.
APPLICATION FILED AUG. 22, 1912.

1,058,097.

Patented Apr. 8, 1913.
6 SHEETS—SHEET 1.

Fig. 1.

WITNESSES
Howard D. Orr
H. T. Chapman

Walter J. Phelps, INVENTOR,
BY E. G. Siggers
ATTORNEY

UNITED STATES PATENT OFFICE.

WALTER J. PHELPS, OF BALTIMORE, MARYLAND, ASSIGNOR OF ONE-HALF TO FRANK GEBBIE, OF ROCHESTER, NEW YORK.

CAN-FILLING MACHINE.

1,058,097.  Specification of Letters Patent.  Patented Apr. 8, 1913.

Application filed August 22, 1912. Serial No. 716,517.

*To all whom it may concern:*

Be it known that I, WALTER J. PHELPS, a citizen of the United States, residing at Baltimore, State of Maryland, have invented a new and useful Can-Filling Machine, of which the following is a specification.

This invention has reference to improvements in can filling machines, and while of general applicability, is designed more especially for filling evaporated milk into cans, and in the following description the term milk will be used as indicative of any liquid for which the machine is adapted.

The present invention is an improvement upon the machine described in application No. 664,829, for can filling machine, filed by me on December 9, 1911.

The general principle of operation of the machine of the present invention is like that of the machine of the said application, that is, cans are provided each completely sealed except for a small filling perforation in one head, which filling perforation is so small as to prevent spontaneous outflow of milk from the filled can when the can is inverted, and the perforation is open. The filling of the milk into the can is caused by the insertion into the can of an air suction tube of minute diameter and a milk conduit is brought into air sealed relation to the perforated head of the can about the perforation, so that there is established within the can a condition of subatmospheric pressure causing the flow of milk into the can by the difference of pressure established within the can and the exterior atmospheric pressure.

The present invention is directed to mechanical improvements tending to adapt the principles of the invention to commercial conditions and demands of more extensive scope than would be made by the particular machine set forth in the aforesaid application.

The present invention contemplates material changes in the general structure of the machine whereby the can carriers or baskets may be greatly multiplied in number without affecting the steadiness of operation of the machine, and, at the same time, materially increasing the output of the machine. Because of the increase in size of the machine, the means for supporting the milk and air ducts and causing the operation thereof is materially modified as to structure. Furthermore, the machine is improved both in construction and operation in many respects, all of which will be made apparent in the following detailed description, taken in connection with the accompanying drawings forming a part of this specification, with the understanding that while the drawings illustrate a practical embodiment of the invention in actual use, the invention is susceptible of other practical embodiments, wherefore it is not confined to any exact conformity with the showing of the drawings, but may be changed and modified so long as such changes and modifications mark no material departure from the salient features of the invention.

Before proceeding to a description of the mechanism, a brief outline of the conditions to be met will be given. It is customary in the canning of evaporated milk to employ three sizes of cans, one of which is known as the baby can, the second of which is known as the family can, and the third of which is known as the tall can, while larger cans are also employed, but not in such numbers as the sizes mentioned. Of the small types of cans mentioned, many millions are annually produced, wherefore a minute saving in the cost of production of each can is very material in the aggregate. In order to bring such desirable result about I produce the cans each completely sealed except for a small filling perforation in the center of one of the heads of the can, and such cans are placed upon the filling machine in the inverted position, that is, with the perforated head downward, and at the completion of the filling operation this perforated head still remains downward for a time with the perforation freely open, so that the perforation must be of so small a size that the milk or other liquid within the can will not spontaneously flow out of this small perforation, being resisted by the surface tension of the liquid bridging the perforation. It is impractical to introduce liquid into the can through so small a perforation through a filling tube and consequently I have provided an air suction tube of minute diameter which may be introduced into the can through the filling perforation to the filling level and when a milk duct, which is provided, is brought into air tight relation to the perforated head of the can about the perforation, air is at once withdrawn from the can through the air suction tube and the milk is forced into the can by the superior exterior atmospheric pressure. The advantages of this mode of filling cans are many, and one of the most important advantages is that the small perforation may be readily sealed after the can has been reinverted so that the perforated head is uppermost, by a small drop of solder, the perforation being so small that the surface tension of the melted solder will hold the solder in the perforation against dropping into the can and in complete bridging relation to the perforation until the solder has hardened, thus completing the sealing, and in practice this sealing may be performed expeditiously, and with such certainty, that it is only on very rare occasions that a can is imperfectly sealed. Because of the small amount of solder employed, the saving in this one item alone over the employment of cans where can caps are used, amounts to many thousands of dollars annually, this having been demonstrated under actual commercial conditions. The suction method of filling the cans has also very material advantages, such as remaining automatically inactive should there be a failure in the placing of the cans in the machine, or should a leaky can be placed in the machine, and also contributes very materially to the simplification of the structure.

Because of the small filling perforation, it requires considerable time to fill a can even though with the inverted cans the filling may take place under pressure on the milk far in excess of a permissible pressure exerted on the milk through a filling tube into a non-inverted can, since under the last-named conditions foaming of the milk will occur. Because of the comparatively slow filling of the cans the machine must be correspondingly enlarged in order to accommodate many cans at one time to bring the output to or above the output of existing can filling machines.

A machine which will fulfil the commercial conditions is illustrated in the drawings, and in its construction is included an expanded pedestal base 1 of appropriate extent to insure stability.

Mounted on the base is a hollow upright pedestal 2 with a laterally expanded top portion 3, the pedestal being made hollow for the sake of lightness, and at the same time to provide the desirable degree of lateral extent. At the central portion of the pedestal are formed alined bearings 4, 5, respectively, these bearings being of sufficient axial extent to insure good bearing and wearing surfaces. The pedestal is connected to the base 1 by bolts or screws 6 and at the upper end is formed with a ball race 7 in which are lodged anti-friction balls 8, while resting on these balls is a plate 9 having a central hollow hub 10 adapted to the bearing 4, and the plate is provided with a ball race 11 adapted to receive the balls 8. The plate 9 is therefore supported by the balls 8, while guided by the hub 10 in the bearing 4.

Carried by the plate 9 is a spider 12 secured to the plate by bolts or screws 13 and formed with a central hollow hub 14, while the spider is provided with radial arms carrying at their outer ends a ring 15 having an inner circumferential upstanding flange 16. The ring is shown as a substantially flat ring outstanding radially from the portion provided with the flange 16, the upper and lower surfaces of the ring being substantially parallel, although this is not obligatory. At appropriate points the ring 15 has passages 17 therethrough, these passages being usually equi-distantly arranged in a continuous series about the ring, and are provided for a purpose which will presently appear.

The hub 10 of the plate 9 carries a hollow shaft 18 extending through and above the hub 14 and also extending to and through the bearing 5, and this shaft may be enlarged in diameter between the two bearings. At the upper end the shaft carries a packing gland 19 through which is passed a pipe 20 extending through a bearing 21 formed in a bracket 22 fast to one of the arms of the spider 12, and this pipe is held against longitudinal movement by set collars 23 on opposite sides of the bearing 21. Above the bearing 21 the pipe 20 leads into a fitting 24 from which lead pipes 25, 26, respectively, and to which is also connected a pressure gage 27.

The lower end of the shaft 18 extends below the bearing 5 and there has fast to it a worm gear wheel 28, while the lower end of the pipe is provided with a packing gland 29 through which there is extended a pipe 30 to the interior of the shaft 18, the arrangement of the packing glands 19 and 29 being such that the respective pipes 20 and 30 may have communication with the interior of the shaft, and the latter may rotate with the spider and worm gear wheel 28 without the pipes 20 and 30 participating in such rotative movement. Rotative movement is imparted to the shaft 18 and by it to the spider 12 by means of a worm 31 on a drive shaft 32, and any suitable means for the control of the driving mechanism may be employed, whereby the machine may be started or stopped at any time, it being customary to provide a controlling lever 33 at one side of the machine. However, as the driving and controlling mechanisms form no part of the present invention it is deemed unnecessary to enter into any detailed description thereof. The power is applied to the lower end of the shaft 18, which shaft rotates within the bearing 5 formed on the pedestal 2, and this shaft is connected in any suitable manner to the plate 9 and hub 14 of the spider 12. The driving and supporting mechanism is therefore largely in the center portion of the machine leaving the exterior of the machine entirely or practically free from all supporting parts.

Since the spider and parts carried thereby constituting the rotor of the machine is designed to carry many cans at a time, some of which are being filled with milk and others are full of milk, the parts are made heavy and rigid without undue weight by web and flange construction, and a broad supporting bearing is provided for the rotor whereby its steadiness of operation is insured. At the same time, despite the weight of the rotor, its movement requires but little power because of the extended anti-friction bearings.

It may be observed that the particular machine illustrated in the drawings is an eighty head machine with the spider approximating eight feet in diameter, and the rotor in the practical operation of the machine is driven at the rate of about one revolution per minute, or somewhat faster, so that eighty or more cans are filled per minute.

Figure 1:
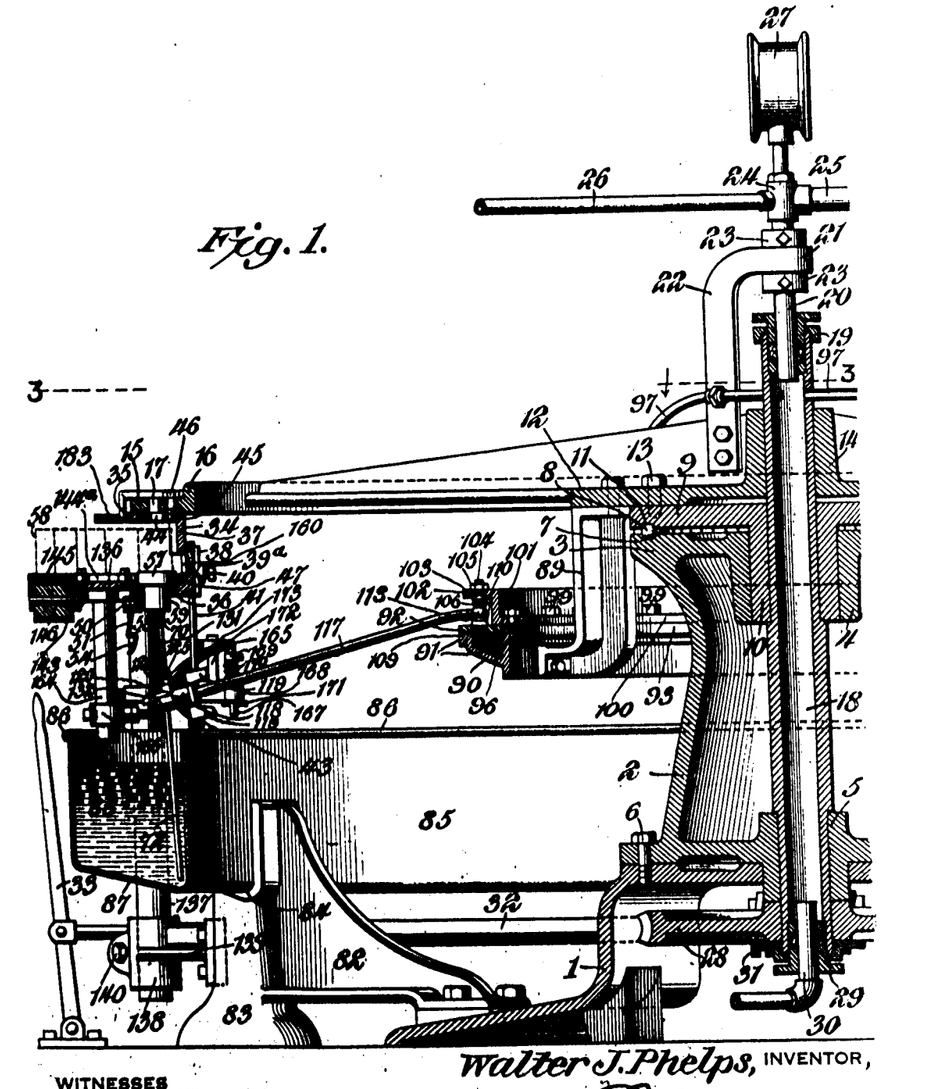
—Figure 1 is a vertical section on a radial plane of a machine embodying the present invention and disclosing but one can basket or carrier with parts associated therewith, the other devices of like kind being omitted for the sake of clearness.
Figure 2:
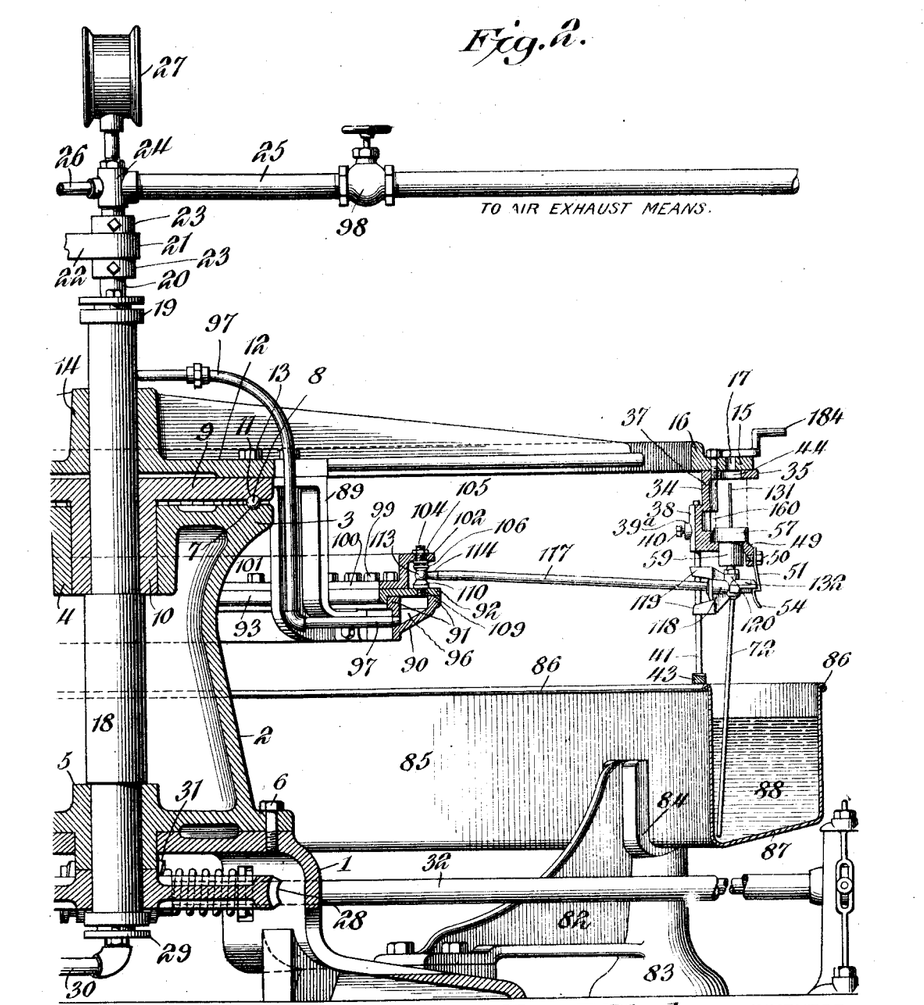
Fig. 2 is a view similar to Fig. 1 but illustrating the other side of the machine with like omissions of parts and indicating some parts in elevation which are shown in section in Fig. 1.
Figure 3:
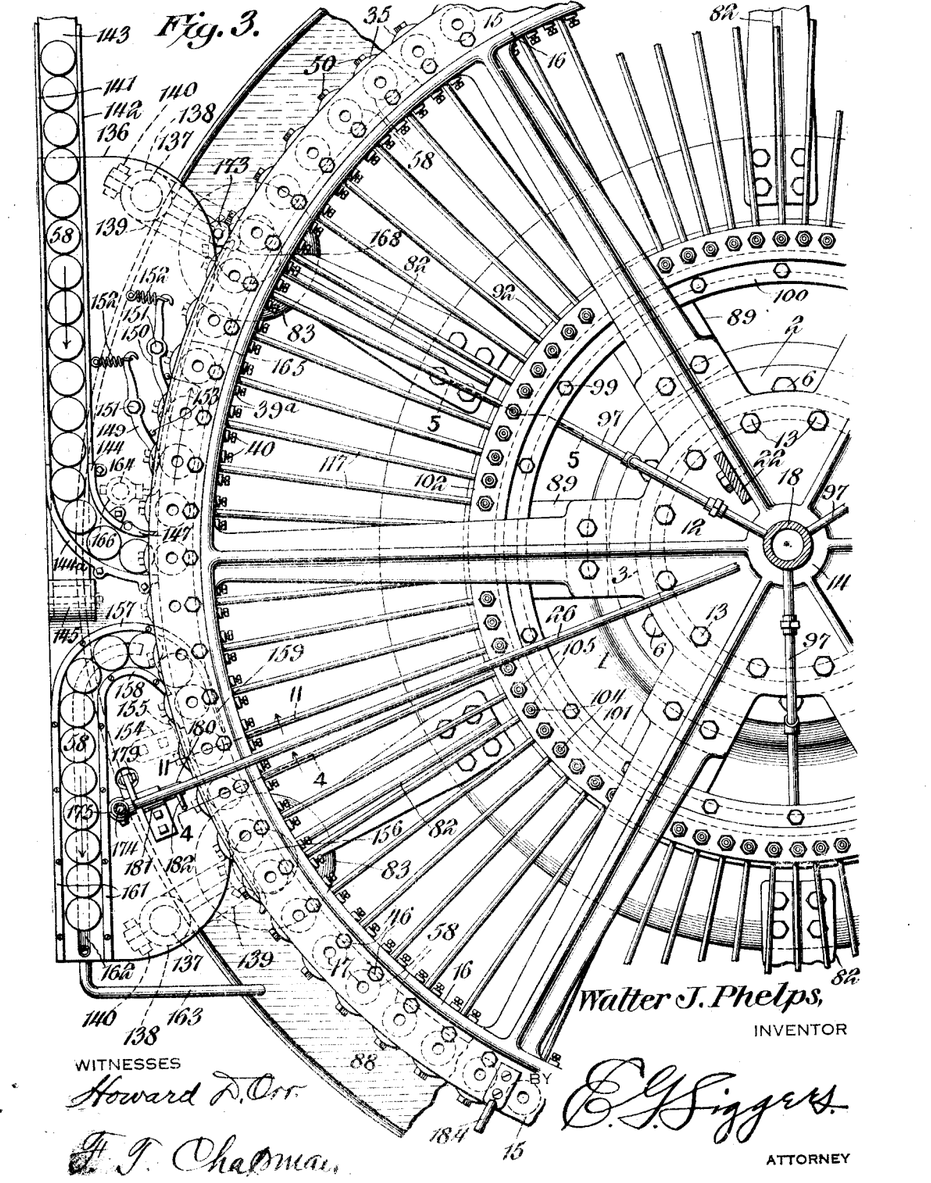
Fig. 3 is a plan view of the structure shown in Fig. 1 with some parts in section on the line 3—3 of Fig. 1, and showing many of the can supporting devices and filling structures associated therewith which are omitted from the showing of Fig. 1.

Pendently supported by the rim or ring 15 are an appropriate number of can baskets or carriers 34 best illustrated in Figs. 4, 6, 7, 8, 9, 10, 11 and 12, although shown on a smaller scale and in less detail in Figs. 1 and 2. Each can basket comprises end plates 35 36 with a connecting arm or yoke 37 formed at the end adjacent the plate 36 with oppositely disposed elongated offset portions 38 each having a passage 39 lengthwise therethrough, one passage being parallel with the other and each offset portion 38 is provided at an intermediate part with a boss 39$^a$ tapped for a set screw 40 extending through the boss into the respective passage 39. Adapted to the passages 39 are rods 41 each formed for a portion of its length with a flattened portion 42. These rods each drop from the can basket for an appropriate distance, and are joined at their lower ends by a block 43 spacing these lower ends the same as the offset portions 38, so that the rods are in substantially parallel relation one to the other. The flattened portion 42 of the rods may be of sufficient length to permit adjustment of these rods lengthwise of the passages 39 for a purpose which will hereinafter appear, it being understood that the block 43 is made permanently fast to the corresponding or lower ends of the rods 41 in any suitable manner.

The plate 35 is provided with a central passage 44 and with a threaded passage 45. The passage 44 when the basket is in position matches a passage 17 in the ring 15, while the threaded passage 45 is for the reception of a screw 46 passing through the ring 15 and entering said passage to hold the basket in position on the ring. At the junction of the plate 36 with the yoke 37 there is formed a shoulder 47 and through the plate there is a passageway 48, the shoulder 47 being curved on an arc coincident with the center of the passageway 48. At the outer end of the plate 36, that is the end remote from the yoke, the plate is provided with a lug 49 extending at an angle thereto in a direction away from the plate 36 and in the installed machine this lug 49 depends. The lug is formed with a tapped hole for the reception of a screw 50 designed to secure a latch spring 51 to the lug, this spring having an elongated perforation 52 at one end for the passage of the screw 50, to permit limited adjustment, while at the other end of this latch spring, which is in the form of a leaf spring, is bent at an angle as shown at 53 to constitute a latch nose, and from this angle portion there extends a tail piece 54 curved away from the latch nose 53. The purpose of this latch will appear hereinafter.

Figures 4, 5, 6, 7, 8:
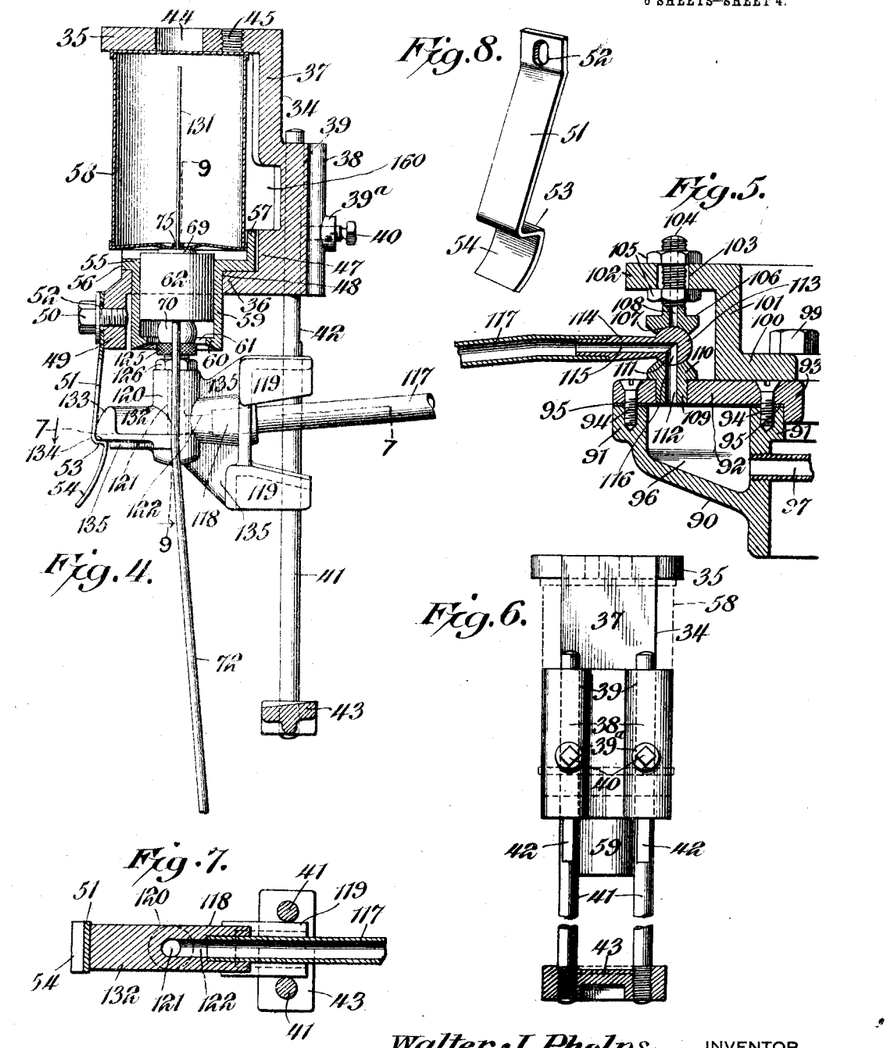
Fig. 4 is a section on the line 4—4 of Fig. 3 but drawn to a larger scale and showing some parts in elevation, the figure being limited to the illustration of a can basket and immediately associated parts.
Fig. 5 is a section on the line 5—5 of Fig. 3 and drawn on the same scale as Fig. 4.
Fig. 6 is an elevation of the structure shown in Fig. 4 as viewed from the right hand side of said figure and omitting the air and milk ducts.
Fig. 7 is a section on the line 7—7 of Fig. 4.
Fig. 8 is a perspective view of a latch spring included in the structure illustrated in Fig. 4.
Figure 9:
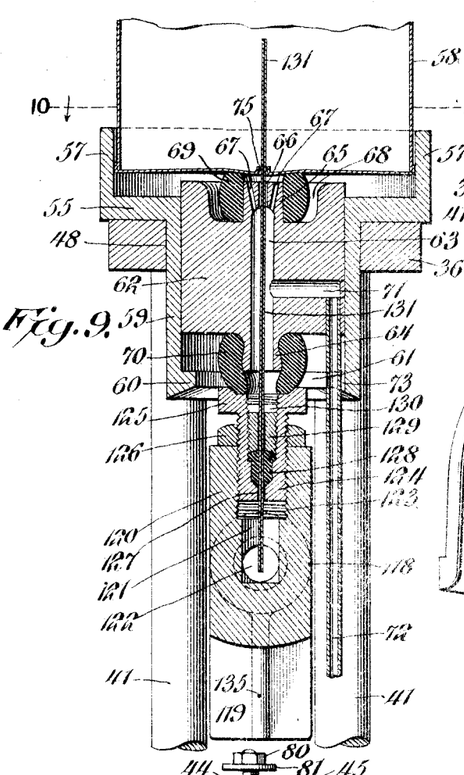
Fig. 9 is a section on the line 9—9 of Fig. 4 but drawn on a larger scale, which scale is substantially full size.
Figure 10:
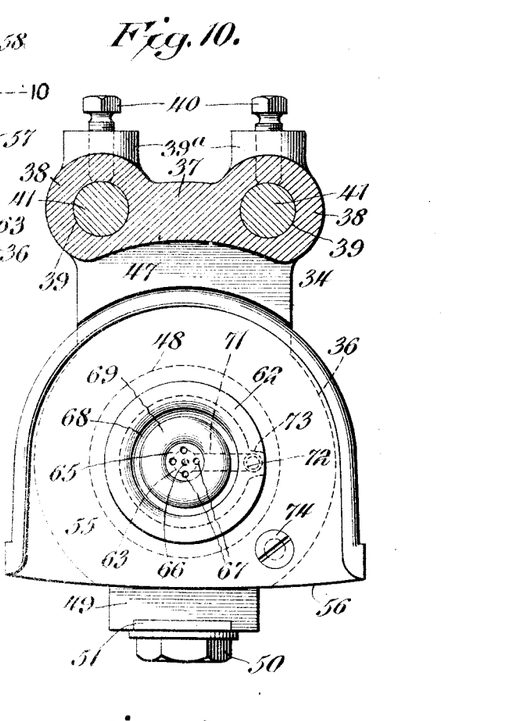
Fig. 10 is a section on the line 10—10 of Fig. 9 with the can omitted.

Adapted to rest on the plate 36 is a can receiving plate 55 having one edge 56 curved on an arc struck from the axis of rotation of the spider, while the remainder of the edge of the plate 55 is in part semi-circular with terminal tangential portions, about which edge there is formed a rib 57 which in the installed machine rises from the can receiving face of the plate, and the rib 57 is of such radius as to form a stop for a can of appropriate size, such can being indicated at 58 in Figs. 1, 4 and 9. The plate 55 has a central passage surrounded by a cylindrical axially extended portion 59 terminating at the end remote from the plate in an inturned flange 60 defining a smaller opening 61 so that the extension 59 constitutes in effect a well open at the bottom. Adapted to this well is a block 62 conforming in shape to the interior of the well, so that it may move axially thereof, being limited in downward movement by engagement with the flange or ledge 60. This block is of less length than the depth of the well, but may move through the plate 55 above the can receiving surface thereof. Extending axially through the block 62 is a passage 63 and at the ends of this passage the block has nipple extensions 64, 65, respectively, the extension 65 being closed at the outer end and provided with a central small passage 66 and a surrounding series of passages 67, each for a purpose to be hereinafter described. The end of the block which may be termed the upper end, is formed with an axially inset channel 68 in surrounding relation to the nipple 65 and seated in this channel in closely embracing relation to the nipple 65 is a ring gasket 69. Surrounding and carried by the nipple 64 is another ring shaped gasket 70 and this last-named gasket may, and preferably is as compressible as the gasket 69, both of these gaskets being preferably made of soft rubber and both are of greater axial length than the nipples carrying them. Leading laterally from the passage 63 at an intermediate point thereof is another passage 71 into which there extends a pipe 72 to one side of and substantially parallel with the bore or passage 63 and close enough to the inner wall of the well to necessitate the provision of a recess 73 in the flange 60 to accommodate the pipe 72, this pipe and recess coacting to prevent rotative movement of the block 62 in the well, but offering no interference with the longitudinal movement of the block in the well.

Figure 11:
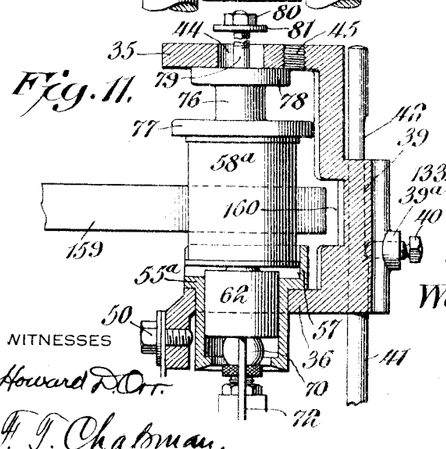
Fig. 11 is a section on the line 11—11 of Fig. 3 but drawn to the scale of Fig. 4 and differing from the showing of Fig. 4 in that adapters for smaller cans are indicated.
Figure 12:
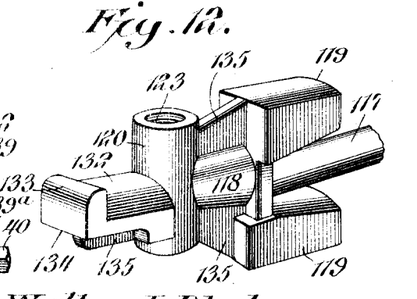
Fig. 12 is a perspective view of a movable head designed to carry the suction tube to be inserted in the cans.

Each plate 55 may be secured to the respective plate 36 of the can basket by a screw 74, so that the can receiving plate 55 may be removed at any time and another like plate substituted. If it be assumed that the machine is adapted to cans of different heights and diameters, then the only change necessary to adapt the machine to one size or the other of cans so far as the supporting or carrying of the cans is concerned, is the substitution of an appropriately sized plate 55 for the larger or smaller plate which may have been in use, and this is readily accomplished by the removal of the screw 74, all the plates designed to initially receive the can being provided with wells 59 of the same size, but the marginal flange 57 will be less extensive for the smaller cans than for the larger cans, so that the can will always be centered with relation to the plate when placed thereupon. In Fig. 11 a small can 58$^a$ is shown in conjunction with a plate 55$^a$ in all respects like the plate 55 except that the flange 57 is of a curvature of less diameter than the flange 57 of the plate 55. Each can 58 or 58$^a$ is provided with a small central perforation 75 in one head, which in the operation of the machine must be brought into matching relation with the passage 66 in the block 62, and this is accomplished by the provision of an appropriate plate 55 or 55$^a$ agreeable to the can to be filled. It transpires, however, that a baby can is of materially less length than a tall can or a family can, so that when a baby can is resting upon a plate 55$^a$ the other end of the can is too far distant from the plate 35, wherefore an adapter is provided consisting of a block 76 having at one end a head 77 of a size to be engaged by the corresponding head of the can 58$^a$ and at the other end with a head 78 adapted to engage against the under face of the plate 35, while a threaded stem 79 will then extend through the passage 44 in the plate 35 and the passage 17 in the ring 15, and then a nut 80 and washer 81 applied to the threaded end of the stem 79 will secure the adapter block 76 to the can basket. As will hereinafter appear, the head 77 forms a relatively fixed member of a clamp for the can when the block 76 is in place, while for the tall cans the plate 35 performs the same office. When cans of different sizes are employed, other adjustments are necessary and provision is made for them, but these adjustments will be referred to hereinafter.

Secured to the base 1 by web extensions 82 are supporting blocks 83 in the nature of legs, and each block or leg has formed at its upper end a seat 84 strengthened by connection with the web 82. There are an appropriate number of legs 83 spaced radially away from the axis of rotation of the rotor for a sufficient distance and the seats 84 receive and support a reservoir 85 of annular form partially underlying the ring 15 of the spider and in part extending radially outward with relation thereto. This reservoir is usually constructed of sheet metal such as sheet copper appropriately tinned where subjected to contact by milk, and the upper end of the reservoir is open, being strengthened at the upper edges by beads 86 as is customary. The reservoir is approximately U-shaped in cross section with one leg of the U longer than the other, so that the inner wall of the reservoir extends downward to a greater distance than the outer wall, and the reservoir is therefore provided with a bottom portion 87 slanting downwardly toward the inner wall adjacent which the reservoir is deepest. The tubes or pipes 72 are each of a sufficient length and appropriately disposed to reach close to the bottom of the reservoir without actually touching it, suitable allowance being made for a limited up and down movement of the tubes 72. As will be seen, these tubes 72 being carried by the blocks 62 and the latter by the can baskets, of which they may form part, and these can baskets being made fast to the ring 15 constituting part of the spider, and rotating with the shaft 18, will be carried by the spider in a circular path with the lower ends of the tubes dipping into the reservoir, which latter is assumed to contain an appropriate quantity of milk, indicated at 88. With this arrangement the tubes which constitute the milk ducts always receive milk from a low point in the reservoir, and hence can never receive any foam which often accumulates on the top of the milk in the reservoir to a considerable depth, milk being particularly liable to foaming. It is to be observed that the reservoir 85 is at all times stationary.

Since the apparatus of the present invention is designed to operate on the suction principle, that is, milk is caused to flow into cans by the production of subatmospheric pressure within the cans, provision is made for accomplishing this result, and the structure for the purpose will now be described.

The spider 12 close to the plate 9 carries an appropriate number of depending brackets or hangers 89 supporting a trough shaped ring 90 having marginal ledges 91 to which is attached an annular plate or ring 92 provided about its inner periphery with a flange 93 offset from one face of the plate so as to engage about the corresponding ledge 91. The ledges 91 are suitably thickened and provided at suitable intervals with tapped holes for the reception of screws 94 passing through the plate 92, and packing 95 is provided to render the junction of the plate 92 with the ledges 91 air tight. The ring 90 with the plate 92 which constitutes a cover therefor, defines an annular chamber 96 which communicates by pipes 97 with the interior of the shaft 18. The pipe 25 communicating with the interior of the shaft through the pipe 20 is in the installed machine connected up to a suitable means for exhausting air therefrom and this is indicated in Fig. 2 of the drawings by the words To air exhausting means, and furthermore the pipe 25 may contain a valve 98.

Secured to the plate 92 by screws 99 or otherwise is a ring 100 at the outer edge of which is an annular flange 101 provided at the edge which constitutes the upper edge when on the installed machine with an outstanding flange 102 in overhanging substantially parallel relation to the corresponding portion of the plate 92. The flange 102 has formed therein a circular series of holes 103 corresponding in number to the can baskets and extending through each hole is a threaded stem 104 having nuts 105 applied thereto on opposite sides of the flange, so that the stem may be locked to the flange in any appropriate position of adjustment. At one end of the stem there is formed an expanded head 106 with a partially spherical socket 107 on that face remote from the stem and extending axially through the stem and opening into the pocket is a passage 108 designed for the reception of lubricant.

The plate 92 carries a series of nipples 109 equal in number to the heads 106 and each expanded on the upper face of the plate 92 into a head 110 similar to the head 106 and likewise provided with a partially spherical seat 111 matching the seat 107. Extending axially through the nipple 109 is a passage 112 opening at one end into a seat 111 and at the other end into the chamber 96. The two seats 107 and 111, coact to grasp a ball head 113 formed on one end of a stem 114. Extending axially through the stem is a passage 115 having an angular extension 116 in the ball 113 so disposed as to match and open into the passage 112. The stem 114 is secured to one end of a pipe or tube 117 which at the other end is secured in a block 118 having spaced wings 119 adapted to move between the rods 41 in such relation thereto that lateral movement of the block 118 is substantially prevented without, however, there being any material binding between the wings 119 and the rods 41. At one side of the block 118 there is formed a boss or enlargement 120 which in the installed machine is directed toward the respective can basket and this boss has a passage 121 communicating with a passage 122 opening into the tube 117. The upper end of the passage 121 is threaded as indicated at 123 for the reception of a screw plug 124 having a laterally expanded head 125 at one end, which latter may be milled for manipulation, while the threaded stem of the screw plug carries a lock nut 126, whereby the stem may be introduced into the threaded portion 123 of the passage 121 to any desirable extent and there held against accidental displacement by the lock nut 126. The plug 124 has at one end an axial passage 127 of small diameter and this passage is enlarged toward the other end to receive packing 128, while at the end of the plug provided with the milled head 125 the passage is still further enlarged and threaded to receive an externally threaded plug 129 provided with a slot 130 for the reception of a manipulating tool. Extending axially through the plug 129 is a small passage in line with the passage 127, and these passages are designed to receive a tube 131 of a length to extend from the interior of the passage 127 through the plug 124, thence through the passage 63 to and through the passage 66 and when, as will hereinafter appear, the head 125 is brought into engagement with the gasket 70 and a cam 58 is engaged by the gasket 69, this tube 131 will extend through the perforation 75 into the can to a point adjacent the imperforate end of the can, such point coinciding with or closely approximating the filling level of the can.

The block 118 has a lug or projection 132 extending from the boss 120 on the side thereof opposite that communicating with the tube 117, and this lug has at one end a rounded portion 133 and at the other end a flat shoulder 134. The block 118 with the wings 119, boss 120 and lug 132 with the parts formed thereon may be all in one casting, and in order to provide requisite strength without undue weight the casting is provided with strengthening webs 135 where needed. While the block 118 is provided with two wings 119 on opposite sides of the tube 117, one of the wings 119 constituting the lower wing is designed to engage the block 43 and this engagement limits the movement herein described of the block 118 in one direction, the movement in the other direction being limited in a manner to be described, the machine being designed to provide for a movement of the tube 131 to an extent to permit its introduction into a placed inverted can to a predetermined limit, and its entire withdrawal from the can. This movement is about an axis coincident with the center of the ball 113 and while the relation of the passages 112 and 116 may be such that at one limit of movement of the block 118 these passages may be closed to each other, it is necessary that at the other limit of movement the passages should be open to each other. It is advisable, however, that the passages 112 and 116 should be always in communication whether the tube 131 be within a can or withdrawn therefrom, practice having demonstrated that the losses due to the air entering the tubes 131 when performing no particular function are negligible.

In a commercial machine it becomes a practical necessity that the empty cans be fed automatically to the machine and the filled cans be taken automatically from the machine. For this purpose there is provided a table 136 of appropriate length for the support of feeding and take-away mechanisms. This table may be substantially straight along the edge remote from the rotor, and along the edge adjacent the rotor this table is curved on an arc struck from the center of rotation of the rotor, since the curved edge of the table should be brought into close relation to the curved edges 56 of the can receiving plates 55 or 55$^a$ as the case may be, wherefore the cans will easily slide on to the plates 55 or from these plates. The table 136 is supported substantially on a level with the upper face of the can receiving plates of the can baskets by means of legs or rods 137 connected at their upper ends to the table near the ends of the latter, and at their lower ends entering split collars 138 on brackets 139 secured to and offset from the appropriate legs 83. The collars 138 are each supplied with a clamp screw 140 by means of which the respective leg 137 is gripped by the collar in any appropriate position of adjustment.

At one end of the table 136 there are provided spaced guide strips 141, 142, respectively, on opposite sides of a conveyer belt 143, this belt extending along the top of the table to a point where the guide strips 141 and 142 are met by curved continuations 144, 144$^a$, respectively, made fast to the top of the table, and while still in parallel relation curving toward the outer edge of the rotor until substantially perpendicular thereto. The conveyer belt is carried beneath the strip 143, under a guard 145, and about a roller 146 journaled on the under face of the table, from whence the belt returns to the starting point. The strips 141 and 142, as well as the continuations 143 and 144, are of such height as to engage and guide the cans while being carried by the conveyer belt and while being directed therefrom to the can receiving plates 55 of the rotor. The end of the curved member 144 adjacent the rotor is provided with a gate 147 constrained to assume a normal position by means of a spring 148 but yieldable to the passage of a can. The conveyer belt is run faster than the feeding of the cans upon the rotor so that there is always a pushing tendency on the cans that have left the belt to move them promptly into their places upon the rotor, but two cans will not move onto the rotor at a time, since the tangential portions of the flanges 57 prevent such movement, these flanges being in close side by side relation.

As the rotor carries the cans from the feeding devices, they are engaged successively by spring controlled pivot fingers 149, 150, so positioned as to hold the cans firmly against the curved portion of the flanges 57 until the cans have become suitably clamped, as will hereinafter appear. Each finger 149 and 150 is mounted on the table 136 by means of a pivot screw 151, and is under the constant control of a spring 152, while a pin 153 in the path of each lever limits its movement toward the can.

Depending from the table 136 is a bracket 154 carrying a throw-off cam 155 designed as will hereinafter appear to engage the tail pieces 54 of the spring latches 51. Extending from this throw off cam 155 in the direction of approaching cans is a safety bar 156 the purpose of which will hereinafter appear. On that part of the table 136 above the cam 155 and bar 156 is a take-off mechanism comprising curved strips 157, 158, respectively, the curved strip 157 terminating in a finger 159, so located as to engage back of a can located in a can basket, this finger entering a recess 160 in the yoke 37 above the shoulder 47. The curved member 158 is so located as to be out of the path of the cans while on the rotor, but coacts with the curved member 157 to direct the cans in a curved path between guide strips 161 on the table 136 substantially in line with the guide strips 141 and 142, but extending in the opposite direction therefrom. Between these guide strips the table is provided with a shallow channel 162, from which there leads a pipe 163 emptying into the reservoir 85, the purpose of which channel being to catch any drip of milk which may occur from the filled cans, although usually there is no such drip.

Depending from that portion of the table 136 corresponding to the receiving end thereof, is a support 164 to which is connected one end of a bar 165 by a collar 166, in which the corresponding end of the bar 165 is pivoted. The other end of this bar 165 is formed with an angle extension 167 passed through a bracket 168 fast to one of the supports 137. The angle extension 167 carries a set collar 169 between which and the bracket 168 the extension is surrounded by a spring 170 tending to maintain the corresponding end of the bar 165 in an elevated position, the movement under the action of the spring being determined by a limiting pin 171 traversing the bar below the bracket 168. Mounted on the bracket 168 is another bracket 172 upstanding therefrom and carrying a roller 173 close to that end of the bar 165 provided with the angle extension 167. The bar 165 is set at an incline, so that the pivoted end supported by the collar 166 is lower than that end adjacent the roller 173. The purpose of the bars 156 and 165 and the cam 155 will appear hereinafter.

Figure 13:
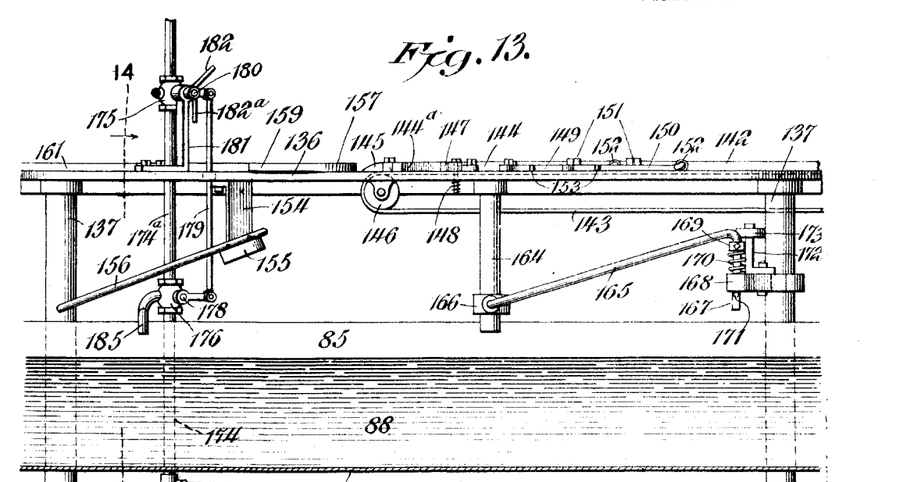
Fig. 13 is an elevation of the filling and take-off tables as viewed from the side toward the axis of rotation of the can carriers, the milk reservoir being shown in section.
Figure 14:
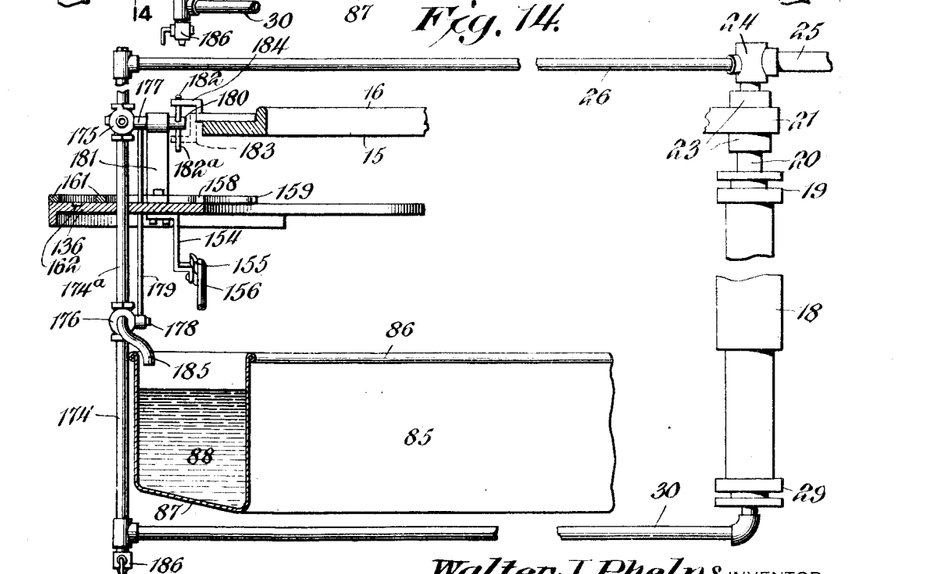
Fig. 14 is a section on the line 14—14 of Fig. 13 and continuing to the axis of the machine but omitting can carriers and associated parts.

The pipe 30 and the pipe 26 are continued to the outer edge of the machine beyond the reservoir and are there connected by another pipe 174 including two valves 175 and 176 which may be of the familiar three-way type and each valve is provided with a valve stem 177, 178, respectively. These valve stems are connected together by a link 179 so as to move simultaneously. The stem 177 is prolonged, as indicated at 180, and is journaled in a bracket 181 erected on the table 136 at an appropriate point. This stem prolongation is traversed by a pin 182 with its opposite ends in the path of two fingers 183 and 184, respectively, these pins being carried by the ring 15 on diametrically opposite sides thereof, as indicated in Figs. 1 and 2 and one of these pins, namely, the pin 184, is shown in full lines in Fig. 14 and the relative position of the finger 183 with respect to the pin 182 is indicated in dotted lines in Fig. 14. From Fig. 13 it will be observed that the opposite ends of the pin 182 are disposed at an angle one to the other as indicated at 182 and 182ª. Of course, it will be understood that the pin 182 may be in fact two pins.

The arrangement is such that when one of the fingers, say the finger 184, engages the pin end 182, if that end be standing upright a movement of the two valves 175 and 176 will be brought about causing the valves to open to the atmosphere and close to the pipe 174, except the continuation of the pipe 174 between the valves, which continuation is designated 174ª. Under these circumstances the valve 175 is placed in communication with the atmosphere and with the pipe 174ª while the valve 176 is placed in communication with a pipe 174ª and also with the atmosphere through a spout 185, which spout is positioned to discharge into the reservoir 85. When the movement of the valves just described has been brought about the pin end 182 will be in an inclined position while the pin end 182ª will stand directly downward and in the path of the finger 182, and when this finger engages the pin end 182ª the valves are moved back to the original position so that the pipe 174 is continuous through the pipe 174ª and communication with the atmosphere is cut off. The lower end of the pipe 174 may be provided with a drain valve 186.

The machine thus described will operate in the following manner to fill cans of the character set forth with any kind of liquid to which the machine is adapted, but as the machine is intended more particularly for filling cans with milk of the character known in the trade as evaporated milk, the description of the operation will be given as though the liquid employed were milk only, but it will be understood that the same description of operation will apply for other liquids. It is assumed that there is a suitable supply of milk 88 in the reservoir 85 and that by any convenient means this supply is maintained therein, but it is not deemed necessary to illustrate any means for maintaining the supply of milk. The level of milk within the reservoir 85 can vary within considerable limits without affecting the operation of the machine, but it is customary to maintain the level approximately constant by introducing milk either continuously or from time to time as necessary. It is also assumed that there is a supply of cans of appropriate size, say cans 58, which are indicated as of the tall variety, and these cans are each wholly closed except that in one head there is a small central perforation 75. In practice this perforation need not exceed about eighty or ninety one-thousandths of an inch in diameter, although it may somewhat exceed these dimensions, and it may even be smaller. Excellent results have been obtained when the perforation is eighty-thousandths of an inch in diameter, and even smaller sizes of perforations have been successfully employed. The suction tube 131 is of sufficient length to reach into a placed can to substantially the filling level and is itself of minute diameter, the passages provided in the tube carrier and in the block 62 for this tube being of commensurate diameter. Excellent results have been obtained with a tube of about forty-thousandths of an inch external diameter and about thirty-thousandths of an inch bore, but the invention is not confined to particular dimensions. Let it further be assumed that power has been applied to rotate the spider with the ring 15 and the can baskets or carriers pendent from said ring, and that cans are being fed by the belt 143 to the feeding section of the machine. The cans move along between the guide strips 141 and 142 until they reach the curved portions 143, 144 whereupon they are directed from the conveyer belt 143 on to the table 136, and toward the rotating spider, the pressure of the line of cans forcing the foremost can on to that plate 55 in its path. Continued rotation of the spider moves the plate with the can thereon away from the feeding mechanism and the next can in order is forced on to the succeeding plate 55 and so on, it being understood that the cans are placed upon the conveyer belt 143 with the perforated ends downward, so that the cans are inverted when they are lodged upon the plates 55. Before reaching the feed zone, that is, when a plate 55 is opposite the discharge end of the can filling mechanism, the latch 51 has already been disengaged in a manner to be described from the nose 132 so that the block 118 has gravitated until the lower wing 119 is in engagement with the block 43, the latter acting as a stop and supporting block. In this position of the parts the tube 131 has its upper end about coincident with the top of the nipple 65 and within the passage 66 and, furthermore, the block 62 is resting upon the ledge or flange 60 at the bottom of the well 59. Since even in this position the tube 117 is in communication with the chamber 96 in turn communicating through the pipes 97 with the hollow shaft 18 and so with the exhaust mechanism, air is being drawn into the tube 131 continuously, but so far as any action of the machine is concerned this indrawing of air is inactive at this time.

As the rotation of the spider continues, and considering but one can and can basket with associated parts, the finger 132 engages on top of the bar 165 at the lower end of the latter, and since this bar is inclined, the block 118 is raised about the ball 113 as a center, the tube 131 being thereby moved upwardly through the passage 66 and into the can through the perforation 75. While this is occurring, and particularly while the tube 131 is entering the can, the latter is engaged by the finger 149 and then by the finger 150, thereby holding the can firmly against the curved portion of the flange 57 of the plate 55, so that the perforation 75 of the can is accurately centered with relation to the passage 66 and tube 131, wherefore there is no danger of the tube engaging the head of the can with such force as to bend or otherwise injure the tube. The perforation 75 which is produced by punching, has a slightly conical form which aids in directing the free end of the tube 131. As the rotative movement of the spider progresses, the finger 132 rides still farther up the bar 165 until ultimately the head 125 of the screw plug 124 is brought into engagement with the gasket 70 and then the block 62 is lifted as the rising movement of the block 118 continues, and then finally the gasket 69 engaging the perforated head of the can about the perforation lifts the can until its imperforate and then upper end is brought into engagement with the plate 35 or in the case of the shorter cans, with the head 77, while the parts are so proportioned that after this has occurred the block 118 is raised still further, so that both gaskets are compressed, the gasket 70 being compressed like the gasket 69, and the can is then firmly clamped against the plate 35, or head 77 as the case may be. While this condition is being brought about, the curved portion 133 of the finger 132 engages the tail piece 54 of the spring latch 51 carried by the can basket in the path of the nose 132, and by the time the clamping has been effectively accomplished the shoulder 134 has risen to an extent allowing the nose 53 of the spring latch to snap under it, thereby locking a block 118 in the raised position with the can clamped between the plate 35 or other resisting part, and the gasket 69, while the tube 131 has been projected into the can so that its upper end is at substantially the predetermined filling level of the can and the can is actually supported by the gasket 69 having been lifted from the receiving plate 55 or 55ª in accordance with the size of the can. The latching of the block 118 in the raised position is insured by the presence of the roller 173, so located that as the block 118 reaches its highest point and rides out of engagement with the bar 165, the roller 173 forces the latch into locking position even if for some reason its elasticity should not accomplish this result. To allow for irregularities in the movement of the rotating parts, the bar 165 is elastically supported by the spring 170, so as to give to excessive forces, thus preventing at this point any liability of injury to the machine or to the cans. During this operation the exhaust has been active and as soon as the can is clamped and sealed about the perforation, air is extracted from the upper inner end of the can until there is produced within the can a condition of subatmospheric pressure which quickly reaches a point where the atmospheric pressure upon the milk within the reservoir causes a flow of milk through the milk duct or tube 72 into the passage 71 and from thence into the passage 73 through the passages or perforations 67 into the space between the nipple 65 and the perforated head of the can where surrounded by the gasket, and through the perforation into the can, the accumulating milk within the can preventing the formation of a stream of milk to an extent producing the effect known as geysering and also effectually preventing foaming of the milk. The filling operation continues as the can under consideration is carried along by the progressive rotative movement of the spider and before the discharge end of the machine which is adjacent the feeding end of the machine has been reached, the can has become filled with milk to the desired level and the milk begins to overflow into the exhaust air or suction tube 131, and some milk finds its way through the air passages into the common exhaust chamber 96 and ultimately into the shaft 18.

The raising of the block 62 for a limited distance to cause the clamping of the can is participated in by the tube 72, but this movement is slight and does not affect the immersion of the tube in the milk to a point near the bottom of the reservoir, so that at no time can milk foam reach the milk tube or duct, and consequently nothing but liquid milk without a trace of foam can reach the can, and practical uniformity of filling is thereby insured.

The block 118 is maintained in the elevated position and the can in the clamped condition by the latch 51 until the discharge end of the machine is approached, when the wing 54 of the latch 51 is engaged by the throw off cam 155 and this cam is so shaped as to move the spring latch against its normal tendency until the nose 54 is withdrawn from supporting relation to the finger 132, whereupon the weight of the block 118 and parts carried thereby causes a sudden dropping of the block about the ball 113 as a center until this dropping movement is arrested by the engagement of the lower wing 119 with the stop block 43. This falling of the block 118 causes the withdrawal of the tube 131 quickly from the can and at the same time a breaking of the seal between the gasket 69 and the perforated head of the can, since the block 62 also falls and the can drops until again supported by the plate 55. The action is so quick that the tube 131 is wholly withdrawn from the can while subatmospheric conditions still exist within the space between the level of the milk within the can and the imperforate end of the can. The tendency to reëstablish normal atmospheric conditions within the can causes an inrush of air through the perforation now out of sealing relation to the gasket 69 and any clinging milk which may be about the perforation is drawn into the can and the perforation is left substantially clean. The seal is not quite so quickly broken between the head 125 and the gasket 70 so that there is an opportunity for milk to fall back through the tube or duct 72 before the seal at the gasket 70 is broken, this milk ultimately reaching approximately to the level of the milk in the reservoir. The amount of milk which will drip from the lower end of the passage 64 through the gasket 70 where parts are so situated with reference to the reservoir that such drip will find its way into the reservoir, since the block 118 in the lowermost position slants toward the reservoir and the gasket 70 is immediately over the reservoir. The parts are so situated that the tube 131 is withdrawn from the filled can and the can is unclamped before being engaged by the take-off finger 159, so that there is no resistance to the movement of the can from the plate 55 into the space between the guide strips 157 and 158 to the guide strips 161, by which latter the cans may be delivered to any suitable place of disposal. In the further treatment of the cans after their removal from the rotatable member of the machine, these cans are reinverted so that the perforated end is uppermost and they may then be sealed by the application of a single small drop of solder, the perforation being so small that the surface tension of the melted solder does not permit the solder to flow through the perforation into the can to an extent to drop therein in the form of shot. Sometimes a sudden jar will cause an outflow of a drop of milk through the perforation, while the can is traveling along the channel 136 between the guides 161, and in order to prevent any possibility of smearing the passageway for the cans the groove 162 is provided, so that should by any possibility any milk escape from the filled cans it finds its way through the pipe 163 back into the reservoir. This is a precautionary means. The bar 156 is also a precautionary device provided for the lifting of any block 118 which may have accidentally been prematurely unlatched, into proper relation to its latch 151, so that the latch may properly engage the unlatching device and not jam thereagainst to thereby injure the machine.

Since at each filling operation a small amount of milk is drawn into the air exhausting ducts and channels and ultimately into the shaft 18, such milk accumulates in the shaft until if not withdrawn it would find its way into the exhaust mechanism to clog and possibly stop the same. This condition might be relieved by occasional opening of the drain valve 186, but this would mean the stoppage of the machine. To render the disposition of the drawn over milk automatic, the pipes 26, 30 and 174 and the valves 175, and 176 are provided, so that at each revolution of the rotor such milk as may have accumulated within the shaft 18 to a point higher than the valve 176 will reach a level in the pipe 174ᵃ equal to the level of the accumulated milk within the shaft while the pipes 26 and 30 are in communication with the pipe 174 and for a time during each revolution of the rotor the pipe 174ᵃ is cut off from communication with the pipes 26 and 30 and are opened to the atmosphere, so that any milk within the pipe 174ᵃ will flow out by gravity through the spout 185 into the reservoir 85. By this means the level of the accumulating milk drawn over by the exhaust mechanism is maintained within such limits as to prevent any passage of the accumulating milk to the exhaust mechanism.

The flattened portion 42 of the rods 41 may be of such length that the rods are so adjusted that when the set screws 40 engage the flattened portion at one end thereof, the stop block 43 is at a position accommodating the machine for tall cans and when the rods are so adjusted that the screws 40 engage the other end of the flattened portion the stop block 43 is so adjusted as to accommodate the machine for baby cans, in which latter case, or when the rods 41 are adjusted at an intermediate position, suitable compensating members 76 are applied to the plates 35 of the can baskets and suction tubes 131 of appropriate length are substituted for the suction tubes 131 used for cans of other heights, so that in each instance the suction tube 131 will reach into the can when introduced therein to substantially the level to which the can is to be filled If the machine were intended for but one size of can then it would be unnecessary to have two spring fingers 149 and 150, since these spring fingers are designed to hold the cans firmly in their seats at the moment of entrance of the exhaust tube 131 into the can. Because of the raising of the stop block 43 for the smaller cans, the bar 165 is not so quickly engaged by the block 118 as with the larger cans, wherefore the second finger 150 is provided to engage the cans at that point where with the smaller cans the exhaust air tube begins to enter the can through the small perforation to assuredly hold the can in centered relation to such exhaust tube at this point in the rotation of the can carrying spider.

The process of canning liquids herein disclosed, but not claimed, is described and claimed in my copending application Serial No. 669,886, filed on January 6, 1912, for process of canning liquids.

What is claimed is:—

1. In a can filling machine, a central pedestal, a spider mounted for rotation thereon and extending radially therefrom, a series of closely adjacent can baskets or carriers supported pendently at the outer portion of the spider, and a liquid directing duct and an exhaust air tube carried by each can basket.

2. In a can filling machine, a central pedestal, a spider mounted for rotation thereon and extending radially therefrom, pendent can supports or baskets at the peripheral portion of the spider, a liquid directing duct, and an exhaust air tube carried by each can basket, and an intermediate pendently supported exhaust chamber exterior to the portion of the pedestal carrying the spider and connected to the exhaust tubes.

3. In a can filling machine, a central pedestal, a spider mounted for rotation thereon and extending radially therefrom, pendent can supports or baskets at the peripheral portion of the spider, a liquid directing duct and an exhaust air tube carried by each can basket, and an intermediate pendently supported exhaust chamber exterior to the portion of the pedestal carrying the spider and connected to the exhaust tubes, said machine being also provided with a stationary annular liquid reservoir into which the liquid ducts carried by the can baskets extend.

4. In a can filling machine, a central pedestal, a spider mounted thereon and extending radially therefrom, pendent can supports or baskets carried by the spider at the marginal portion thereof, and an intermediate annular pendently supported exhaust chamber carried by the spider between the pedestal and the can baskets, liquid ducts individual to and carried by the can baskets, air exhaust tubes individual to and carried by the can baskets and having a predetermined range of movement toward and from the can baskets, air connections between the air tubes, and the air exhaust chamber, and a liquid reservoir in underriding relation to the can baskets in position to receive the liquid ducts and spaced from the can baskets a distance sufficient to permit the stated range of movement of the air tubes.

5. In a can filling machine, a central pedestal, a spider mounted thereon and extending radially therefrom, pendent can supports or baskets carried by the spider at the marginal portion thereof, and an intermediate annular pendently supported exhaust chamber carried by the spider between the pedestal and the can baskets, liquid ducts individual to and carried by the can baskets, air exhaust tubes individual to and carried by the can baskets and having a predetermined range of movement toward and from the can baskets, air connections between the air tubes and the air exhaust chamber, and a liquid reservoir in underriding relation to the can baskets in position to receive the liquid ducts and spaced from the can baskets a distance sufficient to permit the stated range of movement of the air tubes, said reservoir being provided with supports separated from and connected to the pedestal.

6. In a can filling machine, a central pedestal having laterally extended bearings at its upper end, a laterally extended spider rotatably mounted on the extended bearings of the pedestal, a hollow shaft fast to the spider and having bearings in the pedestal, a circular series of can baskets or carriers pendently supported at the marginal portion of the spider, an annular exhaust chamber pendently supported by the spider outside the pedestal between the same and the can baskets, air connections between the exhaust chamber and the hollow shaft, connections for coupling the hollow shaft to air exhaust means, a liquid reservoir in underriding relation to the can baskets, liquid ducts individual to the can baskets and extending into the liquid reservoir, and air exhaust tubes individual to the can baskets and each movable with relation to a can basket to enter an inverted can thereon to a predetermined filling level, and to be entirely withdrawn therefrom, each air tube having a connection to the exhaust chamber.

7. In a can filling machine, a rotatable series of can baskets or carriers each adapted to receive a can with a small filling perforation in one head in the inverted position, an air tube for each can basket movable with relation thereto to introduce the air tube into the can to a predetermined level and to withdraw it wholly therefrom, and a latch on each can basket adapted to hold the filling tube individual thereto in the inserted position with relation to a can.

8. In a can filling machine, a rotatable member, a circular series of can baskets pendently supported thereby, an exhaust air tube for each can basket having a predetermined range of movement with relation to the can basket, and a latch on each can basket in position to hold the air tube at one limit of movement of the air tube with relation to the basket.

9. In a can filling machine, a rotatable series of can baskets each provided with a pendent guide member, a block movable in the guide member, an air tube carried by the block and movable toward and from the can basket with the block, and a latch for holding the block at the limit of its movement toward the can basket.

10. In a can filling machine, a can basket for receiving a can with a small filling perforation in one end in the inverted position on the can basket, a pendent guide member carried by the basket, a block slidable in the guide member toward and from the can basket, a suction tube carried by the block and movable into and out of a can when inverted on the can basket through the small filling perforation, a latch member on the can basket and coacting parts of the block for holding the tube in position to enter a can on the basket in predetermined relation to the imperforate end of the can.

11. In a can filling machine, a can basket provided with a guide thereon adjustable lengthwise of the basket, and a suction tube individual to the basket and movable with relation thereto, said suction tube being provided with carrying means adapted to the guide to move therein to an extent determined by the adjustment of the guide.

12. In a can filling machine, a can basket, a guide member thereon comprising two spaced rods with a connecting block at one end, a carrier movable between the guide rods toward and from the can basket and limited in its movement away from the can basket by the connecting block, and a suction tube on the carrier movable therewith into and out of operative relation to a can on the can basket.

13. In a can filling machine, a can basket comprising two spaced connected plates, a removable can receiving member provided with a well extension adapted to pass through one of the plates, a liquid duct and a carrier therefor, said carrier being adapted to the well and having a limited movement therein and provided with packing means at opposite ends, and a suction tube and carrier therefor, the suction tube being movable through the block and packing means, and the carrier being movable into engagement with the packing means at one end of the block to clamp a can between the packing means at the other end of the block and the end of the can basket remote therefrom.

14. In a can filling machine, a can basket provided with connected spaced members in fixed relation one to the other with one of said members constituting an abutting member for one end of a can of predetermined length, interchangeable can receiving and centering means adapted to the other one of the spaced members, and a can abutting member adapted to the first named one of the connected spaced members for accommodating the can basket to cans of another length than the first-named can.

15. In a can filling machine, a can basket comprising connected spaced members, can receiving and centering means adapted to one member, means for adapting the other member to cans of different lengths, an exhaust air tube movable with relation to the basket into and out of an inverted can on the can receiving member, a carrier for the exhaust tube, and stop means for the carrier mounted on the can basket and adjustable with relation thereto to determine the extent of movement of the exhaust tube.

16. In a can filling machine, a can basket, an exhaust air tube individual to the can basket, a carrier for the exhaust tube, means on the can basket for limiting the movement of the carrier away from the can basket, a latch on the can basket, and coacting means on the carrier for holding the carrier with the air tube extending for a predetermined distance beyond the can receiving surface of the basket.

17. In a can filling machine, a can basket, an exhaust tube and carrier therefor movable toward and from the can basket, a spring latch on the can basket for engaging the carrier and holding the tube in close relation to the can basket 18. In a machine for filling cans, a supporting spider, a rotatable series of can baskets pendently carried by the peripheral portion of the spider, an exhaust chamber pendently carried by the spider at an intermediate portion thereof, liquid ducts individual to and carried by the can baskets, air exhaust tubes individual to the can baskets, and pivoted connecting ducts between the air tubes and the exhaust chamber.

19. In a machine for filling cans, a supporting spider, a rotatable series of can baskets pendently carried by the peripheral portion of the spider, an exhaust chamber pendently carried by the spider at an intermediate portion thereof, liquid ducts individual to and carried by the can baskets, air exhaust tubes individual to the can baskets, and pivoted connecting ducts between the air tubes and the exhaust chamber, each exhaust tube and parts associated therewith being movable by gravity in a direction away from the respective can basket and each can basket being provided with latch means individual thereto for sustaining the respective air tube in the elevated position.

20. In a can filling machine, a rotatable series of can baskets or carriers each provided with centering means, an exhaust air tube movable longitudinally and central with relation to the centering means, means for causing the clamping of a can in the can basket while the can is inverted, and means for holding the can in the centered position while being entered by the air tube.

21. In a can filling machine, a rotatable series of can baskets each provided with means for holding a can with a single small filling perforation in the inverted position on the can basket, an air exhaust tube, means for inserting the exhaust tube in the can through the small filling perforation when the can is inverted on the basket, and means for holding the can in centered relation with respect to the air tube while the latter is being inserted in the can.

22. In a can filling machine, a rotatable series of can baskets each provided with means for holding a can with a single small filling perforation in the inverted position on the can basket, an air exhaust tube, means for inserting the exhaust tube in the can through the small filling perforation when the can is inverted on the basket, and means for holding the can in centered relation with respect to the air tube while the latter is being inserted in the can, said means comprising a spring finger in the path of the can after lodgment on the can basket.

23. In a can filling machine, a rotatable series of can baskets having means for accommodating cans of different sizes, an exhaust air tube individual to each can basket, means for causing a movement of the air tube into a can provided with a small filling perforation in one end when the can is inverted on the basket, and a plurality of can holding means for centering cans of different sizes with respect to the air tube when being inserted into the cans 24. In a can filling machine for filling liquid into cans each of which is provided with a small filling perforation in one end, a rotatable series of can baskets adapted to receive the cans in the inverted position, a liquid duct and an air exhaust tube individual to each can basket, the air tube having a range of movement for insertion into the can to a predetermined level and entire withdrawal therefrom, means for clamping and holding the can in the can basket, the holding means being individual to the can basket, and means for holding a can lodged in the can basket in centralized relation thereto while the air tube is being introduced into the can.

25. In a can filling machine, a can basket adapted to hold a can with a small filling perforation in one end with the can inverted when lodged in the basket, an air exhaust tube of a size and length to enter the can through the small filling perforation to a point adjacent the imperforate end of the inverted can, means for causing the insertion of the air tube into the can and the subsequent clamping of the can in the basket, and means for holding the can in centralized relation to the air tube while the latter is being introduced into the can.

26. In a can filling machine, a can basket adapted to hold a can with a small filling perforation in one end with the can inverted when lodged in the basket, an air exhaust tube of a size and length to enter the can through the small filling perforation to a point adjacent the imperforate end of the inverted can, means for causing the insertion of the air tube into the can and the subsequent clamping of the can in the basket, and means for holding the can in centralized relation to the air tube while the latter is being introduced into the can, each can basket being provided with means individual thereto for locking the can in the clamped position while being filled with liquid.

27. In a can filling machine, a rotatable series of can baskets, can clamping means associated therewith, an air suction tube individual to each basket and movable with relation thereto to enter a small perforation in an inverted can when lodged on the basket, a latch means individual to each can basket, and means for moving the air tube into entering relation to a can lodged in the can basket and by such movement causing the clamping of the can and the locking of the can in the clamped position.

28. In a can filling machine, a rotatable series of can baskets, can clamping means associated therewith, an air suction tube individual to each basket and movable with relation thereto to enter a small perforation in an inverted can when lodged on the basket, a latch means individual to each can basket, and means for moving the air tube into entering relation to a can lodged on the can basket and by such movement causing the clamping of the can and the locking of the can in the clamped position, the air tube being provided with a carrier individual thereto, and actuating means for the air tube comprising a pivoted bar in the path of the carrier and inclined in a direction to cause the movement of the air tube into the can and the carrier into locked relation to the can basket, the end of the bar remote from its pivoted end being provided with a spring mounting.

29. In a can filling machine, a rotatable series of can baskets, can clamping means associated therewith, an air suction tube individual to each basket and movable with relation thereto to enter a small perforation in an inverted can when lodged on the basket, a latch means individual to each can basket, and means for moving the air tube into entering relation to a can lodged on the can basket and by such movement causing the clamping of the can and the locking of the can in the clamped position, the air tube being provided with a carrier individual thereto and the actuating means for the air tube comprising a pivoted bar in the path of the carrier and inclined in a direction to cause the movement of the air tube into the can and the carrier into locked relation to the can basket, the end of the bar remote from its pivoted end being provided with a spring mounting, each can basket carrying a spring latch member, and means being provided adjacent the high end of the inclined bar for insuring the latching movement of the spring latch.

30. In a machine for filling cans, a rotatable series of can baskets, an air suction tube individual to each can basket, a carrier for the suction tube movable toward and from the can basket, and a spring latch on each can basket in position to engage and hold the carrier at one limit of its movement.

31. In a can filling machine, a rotatable series of can baskets, an air exhaust tube, a carrier therefor movable toward and from the can basket and having a normal tendency to gravitate away from the can basket, and a spring latch individual to each can basket for engaging the carrier and holding it in the elevated position.

32. In a can filling machine, a rotatable series of can baskets, an air exhaust tube, a carrier therefor movable toward and from the can basket and having a normal tendency to gravitate away from the can basket, and a spring latch individual to each can basket for engaging the carrier and holding it in the elevated position, the machine being also provided with means for moving the latch from engaging position to the tube carrier on the approach of the can baskets to the discharge end of the machine to release the tube carrier to gravital movement away from the can basket.

33. In a can filling machine, a can basket, means for clamping a can therein, an air exhaust tube movable toward and from the can basket into and out of a can lodged thereon, carrying means for the air tube individual to the can basket and having a normal tendency to move away from the can basket, a spring latch for holding the air tube carrier in the elevated position, and means for moving the latch at the discharge end of the machine in a direction to release the tube carrier 34. In a can filling machine, a can basket, guiding and stop means thereon, an air exhaust tube individual to the can basket and movable into and out of a can lodged thereon, and a carrier for the air tube comprising a block having wings movable in the guiding means and into engagement with the stop means, and having means for engaging and holding the tube, the can basket and tube carrier being provided with coacting latch means.

35. In a machine for filling cans, a rotatable series of can baskets or carriers, air exhaust tubes individual to the can carriers, an annular exhaust chamber movable with the can baskets, an air pipe leading from each exhaust tube to the annular exhaust chamber, and a ball and socket support on the exhaust chamber for each air pipe and provided with means of communication with the interior of the exhaust chamber.

36. In a can filling machine, can supports, air suction tubes individual thereto and each provided with a carrying member, an air duct connected at one end to the air tube and at the other provided with a ball head having a passage therethrough, a suction chamber, and supports for the ball head comprising oppositely directed members with socket portions conforming to the ball head, one of said members having a passage therethrough for communication with the passage through the head.

37. In a can filling machine, can supports, air suction tubes individual thereto and each provided with a carrying member, an air duct connected at one end to the air tube and at the other provided with a head having a passage therethrough, a suction chamber, and supports for the ball head comprising oppositely directed members with socket portions conforming to the ball head, one of said members having a passage therethrough for communication with the passages through the head, the other member being provided with adjusting means and an exhaust passage therethrough.

38. In a can filling machine, means for extracting air from cans lodged in the machine including a suction chamber formed of a body member, a cover member, an overhanging member on the cover member, opposed socket members on the cover member, and overhanging member, respectively, and ball members lodged between the socket members and provided with passages communicating with the interior of the suction chamber, and means carried by each ball member for placing the suction chamber in communication with the interior of a can.

39. In a can filling machine, means for the extraction of air from cans carried by the machine, a closed series of air ducts having upright portions and communicating with the means for exhausting air from the can, said closed series of ducts having in an upright portion means for placing a circumscribed length of the upright portion in communication with the remainder of the series or with the atmosphere in accordance with the position of the parts.

40. In a machine for filling cans, a rotatable series of can supports, means associated therewith for extracting air from cans on the supports, a closed series of ducts communicating with the suction means and including an upright portion, spaced valves in the upright portion movable to complete the continuity of the closed series of ducts or to break such continuity and place the intermediate portion of the duct in communication with the air, and means on the rotatable series of can supports for causing the intermittent operation of the valves in alternate directions.

41. In a machine for filling cans, a rotatable series of can supports, a reservoir for liquid to be filled into the cans, a series of air tubes each individual to a respective can support, means for the extraction of air from the cans through the tubes with the simultaneous introduction of liquid into the cans, liquid ducts above and below the level of the reservoir, and defining a closed circuit for air communicating with the exhaust means and including an upright portion, spaced valves in the upright portion both movable to include the section of the upright portion between the valves in communication with the exhaust means or to place it in communication with the air, the lower one of the valves discharging into the reservoir, and means on the rotatable series of can supports for causing the operation of the valves alternately in opposite directions.

In testimony, that I claim the foregoing as my own, I have hereto affixed my signature in the presence of two witnesses.

WALTER J. PHELPS.

Witnesses:
 PERCY H. MOORE,
 DAVID R. WAGNER.